United States Patent
Zhang et al.

(10) Patent No.: US 7,672,445 B1
(45) Date of Patent: Mar. 2, 2010

(54) METHOD AND SYSTEM FOR NONLINEAR ECHO SUPPRESSION

(75) Inventors: Ming Zhang, Cupertino, CA (US); Jun Yang, San Jose, CA (US)

(73) Assignee: Fortemedia, Inc., Cupertino, CA (US)

( * ) Notice: Subject to any disclaimer, the term of this patent is extended or adjusted under 35 U.S.C. 154(b) by 1466 days.

(21) Appl. No.: 10/371,991

(22) Filed: Feb. 21, 2003

Related U.S. Application Data

(60) Provisional application No. 60/426,833, filed on Nov. 15, 2002.

(51) Int. Cl.
*H04M 9/08* (2006.01)
(52) U.S. Cl. .......................... 379/406.01; 379/406.05; 379/406.08; 379/406.15; 370/286; 370/289
(58) Field of Classification Search .................. 379/406.01–406.16; 370/286, 289
See application file for complete search history.

(56) References Cited

U.S. PATENT DOCUMENTS

| | | | | |
|---|---|---|---|---|
| 4,031,338 | A | 6/1977 | Campanella et al. | 179/170 |
| 4,679,230 | A | 7/1987 | Lassaux et al. | 379/411 |
| 5,475,731 | A | 12/1995 | Rasmusson | 379/3 |
| 5,606,550 | A * | 2/1997 | Jangi | 370/289 |
| 6,108,413 | A * | 8/2000 | Capman et al. | 379/406.13 |
| 6,163,608 | A * | 12/2000 | Romesburg et al. | 379/406.01 |
| 6,195,430 | B1 * | 2/2001 | Eriksson et al. | 379/406.05 |
| 6,282,176 | B1 * | 8/2001 | Hemkumar | 370/276 |
| 6,282,286 | B1 * | 8/2001 | Reesor et al. | 379/406.05 |
| 6,546,099 | B2 * | 4/2003 | Janse | 379/406.01 |
| 6,574,336 | B1 * | 6/2003 | Kirla | 379/406.01 |
| 6,597,787 | B1 * | 7/2003 | Lindgren et al. | 379/406.05 |
| 6,622,030 | B1 * | 9/2003 | Romesburg et al. | 455/570 |
| 6,694,019 | B1 * | 2/2004 | Song | 379/406.04 |
| 6,834,108 | B1 * | 12/2004 | Schmidt | 379/406.01 |
| 2002/0077809 | A1 * | 6/2002 | Walles | 704/201 |
| 2002/0090079 | A1 * | 7/2002 | Stephens et al. | 379/406.08 |
| 2002/0181698 | A1 * | 12/2002 | Takahashi et al. | 379/406.01 |
| 2003/0076949 | A1 * | 4/2003 | Laberteaux | 379/406.05 |

FOREIGN PATENT DOCUMENTS

| FR | EP-0164159 A1 | 5/1985 |
|---|---|---|
| FR | EP-0164159 B1 | 5/1985 |

\* cited by examiner

*Primary Examiner*—Tuan A Pham
(74) *Attorney, Agent, or Firm*—Thomas, Kayden, Horstemeyer & Risley

(57) ABSTRACT

Techniques for suppressing large echo due to nonlinearity, instable adaptive filter, and so on. An echo cancellation system includes an echo canceller unit, a nonlinear echo detection unit, and a nonlinear echo suppression unit. The echo canceller unit (e.g., an adaptive filter) receives a reference signal and a near-end signal, derives an echo estimate signal based on the reference and near-end signals, cancels a portion of echo in the near-end signal based on the echo estimate signal, and provides an intermediate signal having residual echo. The nonlinear echo detection unit detects for large nonlinear echo in the echo estimate signal. The nonlinear echo suppression unit suppresses large nonlinear echo in the first intermediate signal based on a variable gain, which may be adjusted lower if large nonlinear echo is detected and higher otherwise.

20 Claims, 7 Drawing Sheets

METHOD AND SYSTEM FOR NONLINEAR ECHO SUPPRESSION

CROSS-REFERENCES TO RELATED APPLICATIONS

This application claims the benefit of provisional U.S. Application Ser. No. 60/426,833, entitled "Nonlinear Echo Cancellation," filed on Nov. 15, 2002, which is incorporated herein by reference in its entirety for all purposes.

This application is further related to U.S. application Ser. No. 10/193,689, entitled "Channel Control and Post Filter for Acoustic Echo Cancellation," and U.S. application Ser. No. 10/193,739, entitled "Acoustic Echo Cancellation with Adaptive Step Size and Stability Control," both filed on Jul. 10, 2002, assigned to the assignee of the present application and incorporated herein by reference in their entirety for all purposes.

BACKGROUND OF THE INVENTION

The present invention relates generally to signal processing, and more specifically to techniques for suppressing acoustic echo due to serious nonlinearity.

Full-duplex hands-free communication systems are commonly used for many applications, such as speakerphone, hands-free car kit, teleconferencing system, cellular phone, and so on. For each of these systems, one or more microphones in the system are used to pick up an acoustic signal emitted by a speaking user, which is then processed and transmitted to a remote user. However, the microphones may also pick up undesirable reflections of the acoustic signal from the borders of an enclosure, such as a room or a car compartment. The propagation paths for the reflections may change due to various factors such as, for example, movement of the microphones, the loudspeaker, and/or the speaking user, volume changes on the loudspeaker, and environment changes. As a result, the electro-acoustic circuit in the system may become unstable and produce howling, which is highly undesirable.

In the case of a telecommunication system, a speech signal from a remote speaking user is outputted from a loudspeaker, and portions of this speech signal may be reflected to the microphones and transmitted back to the remote user. This acoustic disturbance is referred to as echo. Echo may also be caused by signal reflections generated by a hybrid circuit that converts between 4-wire circuit and 2-wire circuit. Regardless of the cause of echo, users are generally annoyed of hearing their own voice delayed, for example, by the path of the system.

Echo suppression or cancellation is often required in many communication systems to suppress or eliminate echo as well as to avoid howling effects. For example, echo cancellation is typically used in full-duplex communication environments where the speaker and microphone may be located some distance away from a user. Examples of such environments include hands-free speakerphone (e.g., in a vehicle or a room), Internet/Intranet Protocol phone, and so on.

Conventionally, echo cancellation is achieved by a circuit that employs an adaptive filter. The adaptive filter performs echo cancellation by deriving an estimate of the echo based on a reference signal, which may be a line output from a communication or telematics device such as a cellular phone or some other device. The adaptive filter is typically able to remove the portion of the echo that is correlated to the reference signal.

However, conventional echo cancellation techniques are not able to remove certain portions of the echo. For example, nonlinearity of the circuitry in the system (e.g., the speaker, analog-to-digital (A/D) converter, digital-to-analog (D/A) converter, and so on) generates echo that is not correlated to the reference signal. This type of echo cannot be canceled by conventional echo cancellation techniques that employ only an adaptive filter. Moreover, user movement, position changes in the microphones and loudspeakers, and volume changes can cause the echo path to vary. This results in time-varying echo that typically cannot be canceled very well, particularly if the echo path changes faster than the convergence rate of the adaptive filter.

Nonlinear echo cancellation techniques may be used to attempt to cancel the residual echo that is not canceled by the adaptive filter in the echo canceller. However, these techniques typically cannot cancel echo due to serious nonlinearity. Nonlinear echo may be caused by various conditions such as an overdriven speaker, a microphone in saturation, mechanical vibration, and so on. These techniques also cannot handle high volume echo. Moreover, some conventional nonlinear echo cancellation techniques, such as a center clipper, can cause voice distortion by cutting off low power voice signal. Conventional center clippers are described, for example, in U.S. Pat. Nos. 4,031,338, 4,679,230 and 5,475,731, and European Patent Nos. EP-0164159-A1 and EP-0164159-B1. Other conventional nonlinear echo cancellation techniques, such as conventional post filters, also cannot deal with large echo and serious nonlinearity.

As can be seen, techniques that can effectively cancel large echo and/or echo due to serious nonlinearity in communication systems are highly desirable.

SUMMARY OF THE INVENTION

Techniques are provided herein for suppressing echo due to nonlinearity in electro-acoustic components (e.g., loudspeaker and microphone), instable adaptive filter, and rapid echo path changes, which typically cannot be canceled by conventional echo cancellation techniques. The inventive techniques can provide improved echo suppression performance and enhanced full-duplex and voice quality, all which are highly desirable for various applications such as hands-free full-duplex communication systems.

A specific embodiment of the invention provides an echo cancellation system comprising an echo canceller unit, a nonlinear echo detection unit, and a nonlinear echo suppression unit. The echo canceller unit (which may be implemented as an adaptive filter) receives a reference signal and a near-end signal, cancels a portion of echo in the near-end signal using the reference signal, and provides a first intermediate signal having residual echo. The residual echo includes nonlinear echo when serious nonlinearity is encountered. The nonlinear echo detection unit detects for large nonlinear echo in the residual echo and provides a detection signal that indicates whether or not large nonlinear echo is detected. The nonlinear echo suppression unit suppresses large nonlinear echo in the first intermediate signal based on a variable gain. The nonlinear echo suppression unit provides a second intermediate signal having at least a portion of the large nonlinear echo in the first intermediate signal suppressed.

The detection of the nonlinear echo in the first intermediate signal may be based on the power of the near-end signal and the power of the echo estimate signal. The detection of the nonlinear echo may also be based on a step size signal that is used to update coefficients of the adaptive filter. The variable gain may be obtained based on the detection signal and may be adjusted lower if the detection signal indicates that large nonlinear echo is detected or higher otherwise. The variable gain may be obtained iteratively based on a delayed variable gain for a prior sample period and the detection signal, and may also be limited to a specified range of values.

The echo cancellation system may further include a post filter and an adjustable filter. The post filter provides a set of coefficients that is used for suppressing remaining echo in the second intermediate signal. The set of coefficients may be selected to minimize error between the near-end signal and the second intermediate signal. The adjustable filter then filters the second intermediate signal with the set of coefficients to provide an output signal having more of the echo removed.

Various other aspects, embodiments, and features of the invention are also provided, as described in further detail below.

The foregoing, together with other aspects of this invention, will become more apparent when referring to the following specification, claims, and accompanying drawings.

DESCRIPTION OF THE SPECIFIC EMBODIMENTS

For clarity, various signals and controls for the echo cancellation systems described herein are labeled with either lower case or upper case symbols. Time-variant signals and controls are labeled with "(n)", where n denotes sample time. Lower case symbols (e.g., r(n)) are used to denote scalars, and upper case symbols (e.g., H(n)) are used to denote vectors. The operations shown in the figures may be scalar operations (if both input operands are denoted with lower case symbols) or vector operations (if at least one input operand is denoted with an upper case symbol).

Figure 1:
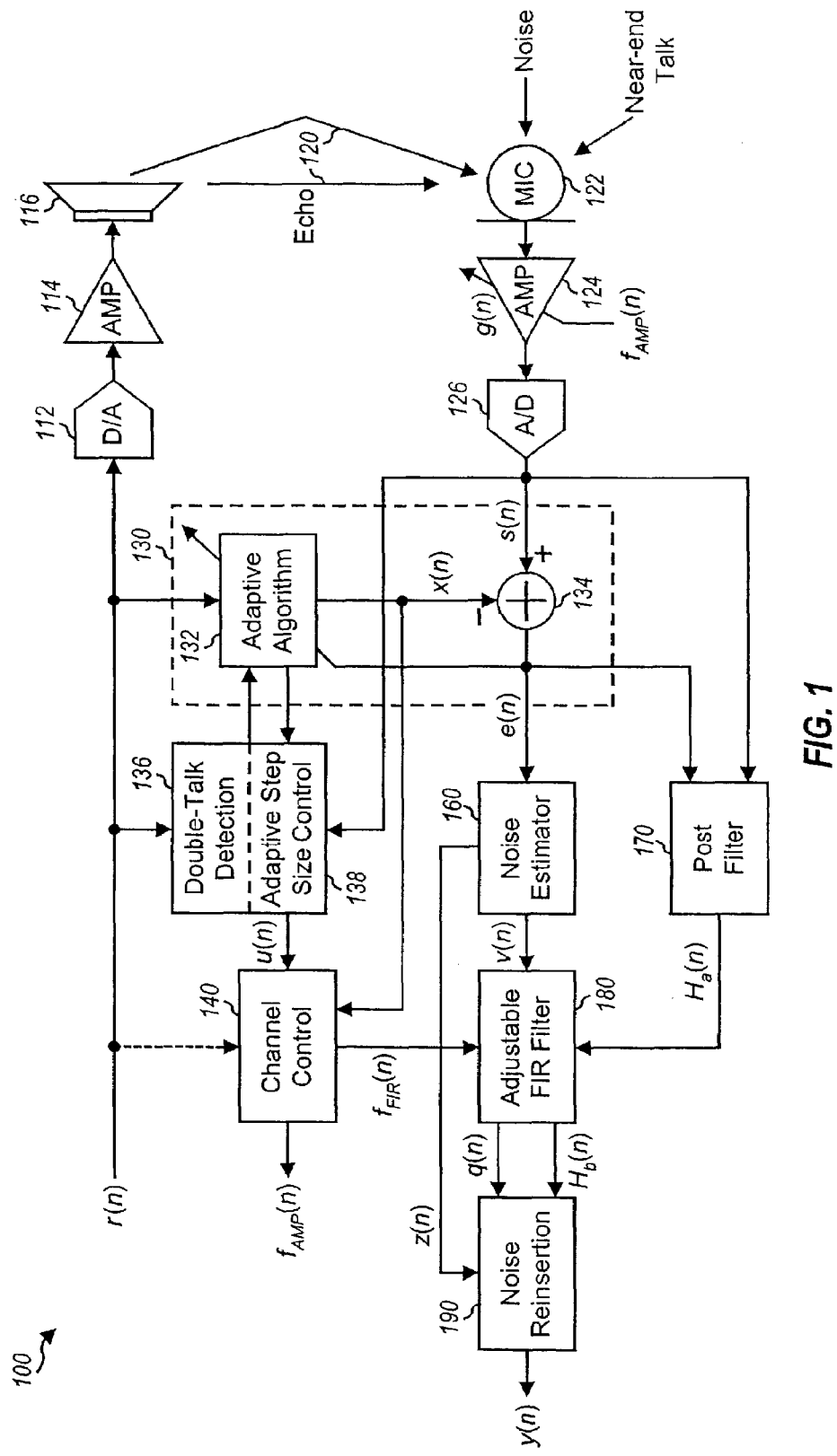
FIG. 1 shows an echo cancellation system capable of removing some nonlinear echo.

FIG. 1 shows a block diagram of an echo cancellation system 100 that is capable of removing some echo due to nonlinearity. In the output path, a digital signal r(n), which includes audio activity (e.g., speech) from a far-end source, is converted to an analog signal by a digital-to-analog (D/A) converter 112, amplified by a power amplifier 114, and outputted from a speaker 116 to one or more near-end users. A far-end user is one who is located away (or remote) from system 100, and a near-end user is one who is located within the vicinity of system 100. The far-end signal r(n) is also used as a reference signal for an adaptive filter 130.

In the input path, a microphone 122 receives audio activity from the one or more near-end users (i.e., near-end voice or talk), local ambient noise, and echo from speaker 116 via echo paths 120. The signal from microphone 122 is amplified by an amplifier 124 and further digitized by an analog-to-digital (A/D) converter 126 to provide a digitized near-end signal s(n).

Adaptive filter 130 receives the reference signal r(n), the near-end signal s(n) that includes the echo to be suppressed, and a double-talk control signal from a double-talk detection unit 136 and/or a step size signal u(n) from an adaptive step size control unit 138. Adaptive filter 130 then filters the reference signal r(n) based on a set of filter coefficients H(n) to provide an estimate of the echo in the near-end signal s(n). The echo estimate signal x(n) is then subtracted from the near-end signal s(n) by a summer 134 to provide an error signal e(n). The error signal e(n) is provided to other processing units and is also fed back to an adaptive algorithm 132 and used to update the filter coefficients.

Double-talk detection unit 136 or adaptive step size control unit 138 may be used to control the updating of the filter coefficients by adaptive algorithm 132. Double-talk detection unit 136 processes the far-end signal r(n) and the near-end signal s(n) to determine whether or not double-talk exists. Near-end talk refers to audio activity (e.g., speech) from a near-end user, far-end talk refers to audio activity from a far-end user, and double-talk refers to a situation when both near-end talk and far-end talk are present. For a teleconference system, the near-end talk may come from users within the room where the teleconference system is installed, and the far-end talk may come from users outside the room. Double-talk detection unit 136 provides the double-talk control signal to adaptive filter 130. This control signal indicates whether or not double-talk is present and may be used to control the updating of the filter coefficients by adaptive algorithm 132.

Adaptive step size control unit 138 provides the step size signal u(n) that may be used to control the updating of the filter coefficients by adaptive algorithm 132. A specific design for adaptive step size control unit 138 is described in the aforementioned U.S. patent application Ser. No. 10/193,739.

Adaptive algorithm 132 updates (i.e., trains or adapts) the filter coefficients based on the reference signal r(n), the near-end signal s(n), and the double-talk control signal and/or the step size signal u(n). If double-talk detection unit 136 is used to control adaptive algorithm 132, then the filter coefficients are updated when far-end talk is detected and double-talk is not detected (i.e., when the near-end signal s(n) includes mostly the echo from the far-end signal r(n)). Alternatively, if adaptive step size control unit 138 is used to control adaptive algorithm 132, then the filter coefficients may be updated whenever adaptive algorithm 132 is enabled (e.g., at all times, even when double-talk is detected). However, the updating is performed based on the variable step size signal u(n). For example, the step size signal u(n) may be smaller when double-talk exists and may be larger when double-talk is not present. Adaptive algorithm 132 may implement a least mean square (LMS) algorithm, a normalized least mean square (NLMS) algorithm, or some other adaptive algorithm to update or train the filter coefficients.

If the filter coefficients are effectively trained, then an accurate estimate of the echo may be obtained. In that case, the echo estimate signal x(n) is approximately equal to the near-end signal s(n) when double-talk is not present, and the error signal e(n) would be small. However, adaptive filter 130 is only able to cancel correlated echo and typically cannot cancel at least a portion of the echo. In this case, the error signal e(n) would include the residual echo that has not been canceled. The residual echo may include echo due to various factors such as (1) nonlinear effects in amplifier 114, microphone 122, A/D converter 126, speaker 116, and so on, especially when the volume is high, (2) change in the echo paths, (3) an inadequate number of taps in adaptive algorithm 132 to accurately estimate the echo, and so on. Additional signal processing may then be performed to attempt to cancel the residual echo.

A noise estimator 160 receives the error signal e(n), estimates the amount of noise in the error signal e(n), and provides a noise estimate z(n). In one embodiment, the error signal e(n) is processed by a noise reduction unit (which may be implemented within noise estimator 160) to provide a noise-suppressed signal. In another embodiment, the noise reduction is not performed. In either case, noise estimator 160 provides an output signal v(n) based on the error signal e(n). The output signal v(n) is equal to the error signal e(n) if noise suppression is not performed by noise estimator 160, and is equal to the noise-suppressed signal if noise suppression is performed.

A post filter 170 receives and processes the near-end signal s(n) and the error signal e(n) to provide a set of coefficients $H_a(n)$ for an adjustable finite impulse response (FIR) filter 180. The coefficients $H_a(n)$ are used to remove as much of the residual echo in the signal v(n) as possible and may be derived as described below.

Adjustable FIR filter 180 receives the signal v(n) from noise estimator 160, the coefficients $H_a(n)$ from post filter 170, and a control signal $f_{FIR}(n)$ from a channel control unit 140. The signal v(n) includes residual echo due to various factors (e.g., nonlinearity, echo path change, and so on). Adjustable FIR filter 180 attempts to remove as much of this residual echo as possible to provide improved echo cancellation performance. In an embodiment, adjustable FIR filter 180 initially adjusts the coefficients $H_a(n)$ based on the control signal $f_{FIR}(n)$ to provide adjusted coefficients $H_a'(n)$. Adjustable FIR filter 180 then filters the signal v(n) based on the adjusted coefficients $H_a'(n)$ to provide a signal q(n) having as much of the residual echo removed as possible.

A noise reinsertion unit 190 receives the signal q(n) from adjustable FIR filter 180, the noise estimate signal z(n) from noise estimator 160, and a set of coefficients $H_b(n)$ from adjustable FIR filter 180. The coefficients $H_b(n)$ are indicative of the amount of noise to reinsert (i.e., add or "paste") back into the signal q(n). In the process of removing as much of the remaining echo as possible, adjustable FIR filter 180 also removes a corresponding amount of noise. For some applications, it is important to maintain the noise level in the output signal approximately constant. This may be necessary, for example, so that changes in the noise level is not mistaken by a subsequent processing unit as changes in the near-end environment or some other factors. Noise reinsertion unit 190 initially derives a noise component z'(n) to be reinserted back into the signal q(n). This noise component z'(n) is derived based on the noise estimate z(n) and the coefficients $H_b(n)$. Noise reinsertion unit 190 then adds the noise component z'(n) back to the signal q(n) to provide an echo-suppressed output signal y(n).

Channel control unit 140 receives the reference signal r(n), the echo estimate signal x(n), and the step size signal u(n) if adaptive step size control unit 138 is used to control the updating of the filter coefficients by adaptive algorithm 132. Channel control unit 140 processes the received signals and provides control signals $f_{FIR}(n)$ and $f_{AMP}(n)$ for adjustable FIR filter 180 and adjustable amplifier 124, respectively.

Exemplary designs for adaptive filter 130, channel control unit 140, post filter 170, adjustable FIR filter 180, and noise reinsertion unit 190 are described below and in the aforementioned U.S. patent application Ser. No. 10/193,689.

Post filter 170 and adjustable FIR filter 180 in echo cancellation system 100 are capable of removing certain types of residual echo. However, the post filter is not totally effective in canceling large echo due to serious nonlinearity (e.g., due to excessively overdriven loudspeaker, saturated microphone, and so on) and residual echo due to the instability of the adaptive filter. Moreover, the post filter is also not effective at suppressing residual echo when the echo path changes dramatically.

Figure 2:
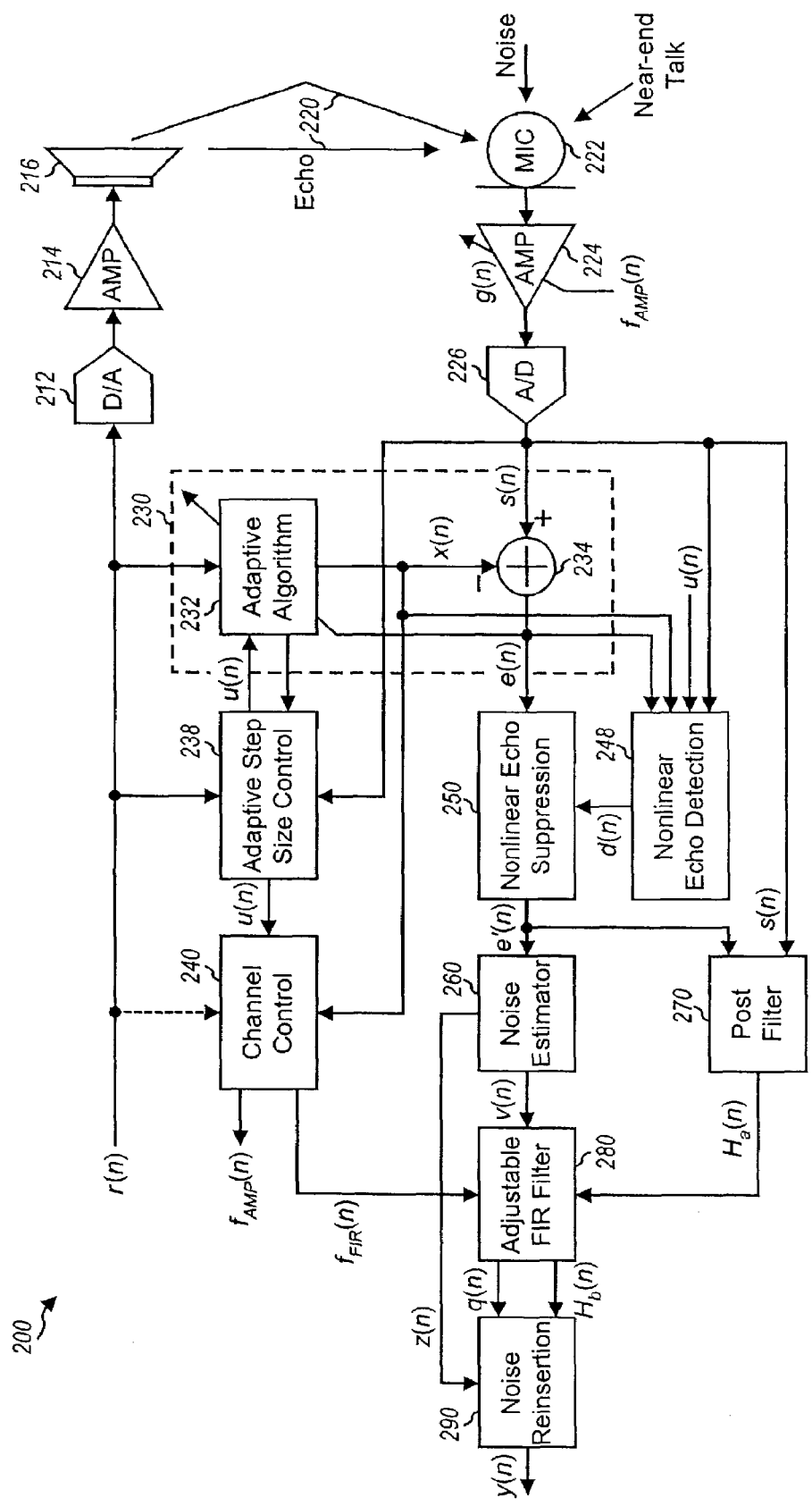
FIG. 2 shows an echo cancellation system capable of suppressing large nonlinear echo.

FIG. 2 shows a block diagram of an echo cancellation system 200 that is capable of suppressing echo due to serious nonlinearity, adaptive filter instability, and rapid echo path changes. In the output path, the far-end signal r(n) is converted to an analog signal by a D/A converter 212, amplified by a power amplifier 214, and outputted from a speaker 216 to one or more near-end users. The far-end signal r(n) is also used as the reference signal for an adaptive filter 230. In the input path, a microphone 222 receives near-end voice, local ambient noise, and echo from speaker 216 via echo paths 220. The signal received by microphone 222 is amplified by an adjustable amplifier 224 with a gain g(n) and further digitized by an A/D converter 226 to provide the near-end signal s(n).

Adaptive filter 230 filters the reference signal r(n) based on a set of filter coefficients H(n) to provide an estimate of the echo in the near-end signal s(n). The echo estimate signal x(n) is then subtracted from the near-end signal s(n) by a summer 234 to provide an error signal e(n) (which is a first intermediate signal). An adaptive algorithm 232 updates the filter coefficients based on the error signal e(n) and a step size signal u(n) from a step-size control unit 238.

A nonlinear echo detection unit 248 receives the echo estimate signal x(n), the near-end signal s(n), and the step size value u(n). Nonlinear echo detection unit 248 processes these signals to detect for presence of large nonlinear echo in the near-end signal. Unit 248 then provides a detection signal d(n) that indicates whether or not large nonlinear echo is detected in the near-end signal s(n).

A nonlinear echo suppression unit 250 receives the error signal e(n) and the detection signal d(n). Nonlinear echo suppression unit 250 uses the detection signal d(n) to generate a variable gain $g_d'(n)$, which is then used to suppress large echo due to nonlinearity in the system and instability of the adaptive filter. Nonlinear echo suppression unit 250 provides an error signal e'(n) (which is a second intermediate signal) having at least a portion of the large nonlinear echo suppressed.

A noise estimator 260 receives the error signal e'(n), estimates the amount of noise in the error signal e'(n), and provides a noise estimate z(n). In one embodiment, the error signal e'(n) is processed by a noise reduction unit (which may be implemented within noise estimator 260) to provide a noise-suppressed signal. In another embodiment, the noise reduction is not performed. In either case, noise estimator 260 provides an output signal v(n) based on the error signal e'(n). The output signal v(n) is equal to the error signal e'(n) if noise suppression is not performed by noise estimator 260 and is equal to the noise-suppressed signal if noise suppression is performed.

A post filter 270 receives and processes the near-end signal s(n) and the error signal e'(n) to provide a set of coefficients $H_a(n)$ for an adjustable FIR filter 280. The coefficients $H_a(n)$ are used to remove as much of the remaining echo in the signal v(n) as possible.

Adjustable FIR filter 280 receives the signal v(n) from noise estimator 260, the coefficients $H_a(n)$ from post filter 270, and a control signal $f_{FIR}(n)$ from a channel control unit 240. The signal v(n) includes remaining echo due to various factors, and adjustable FIR filter 280 attempts to remove as much of this remaining echo as possible to provide improved echo cancellation performance. In an embodiment, adjustable FIR filter 280 initially adjusts the coefficients $H_a(n)$ based on the control signal $f_{FIR}(n)$ to provide adjusted coefficients $H_a'(n)$. Adjustable FIR filter 280 then filters the signal v(n) based on the adjusted coefficients $H_a'(n)$ to provide the signal q(n) having as much of the remaining echo removed as possible.

A noise reinsertion unit 290 receives the signal q(n) from adjustable FIR filter 280, the noise estimate signal z(n) from noise estimator 260, and a set of coefficients $H_b(n)$ from adjustable FIR filter 280. Noise reinsertion unit 290 then pastes an amount of noise (as indicated by the coefficients $H_b(n)$) back into the signal q(n) to provide the echo-suppressed signal y(n).

Channel control unit 240 receives and processes the reference signal r(n), the echo estimate signal x(n), and the step size signal u(n) to provide the control signals $f_{FIR}(n)$ and $f_{AMP}(n)$ for adjustable FIR filter 280 and adjustable amplifier 224, respectively.

Exemplary designs for some of the processing units in FIGS. 1 and 2 are described in detail below.

Figure 3:
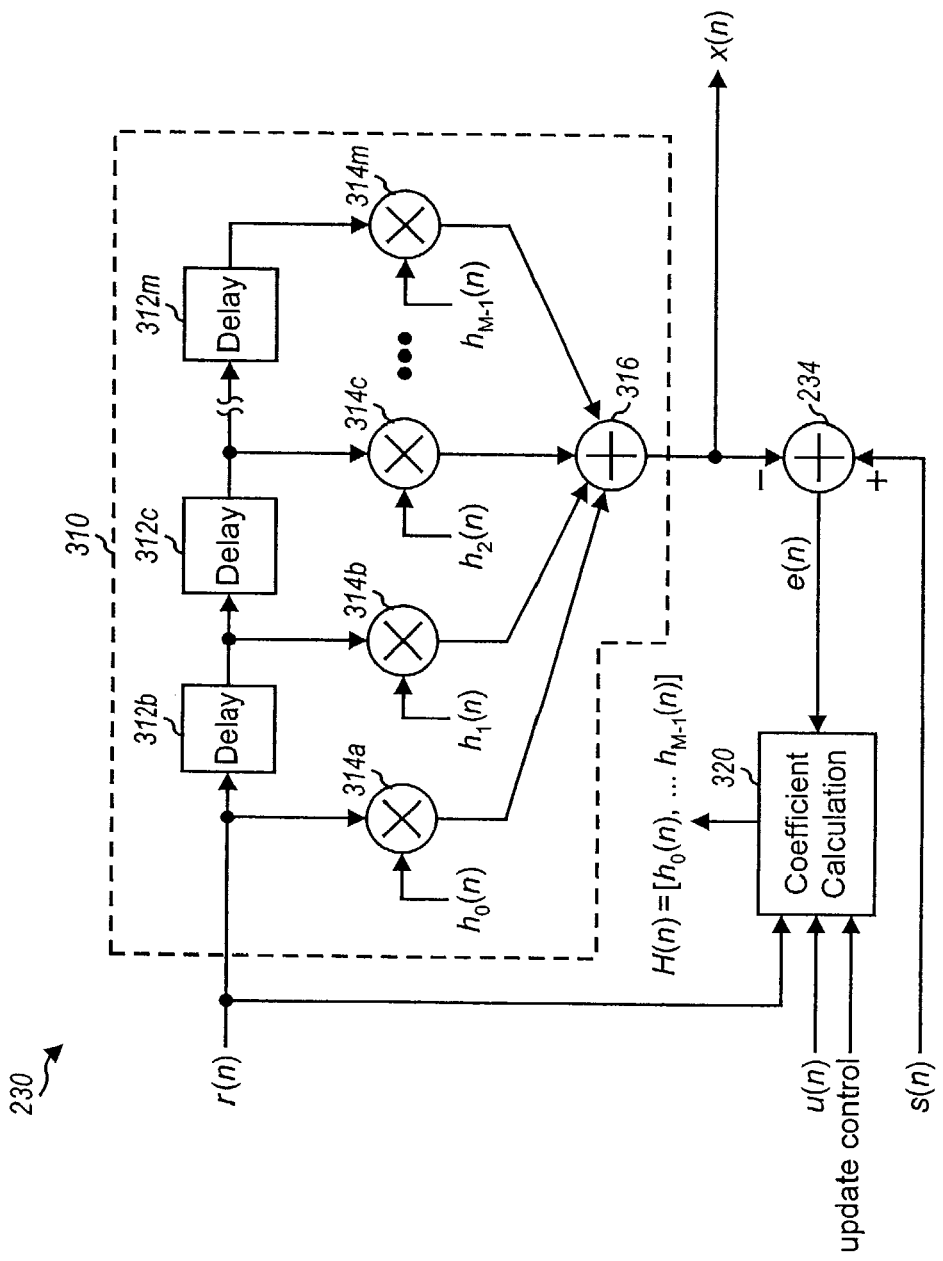
FIG. 3 shows an adaptive filter.

FIG. 3 shows a block diagram of an embodiment of adaptive filter 230, which includes a FIR filter 310, summer 234, and a coefficient computation unit 320. An infinite impulse response (IIR) filter or some other filter architecture may also be used in place of the FIR filter.

Within FIR filter 310, the digital samples for the reference signal r(n) are provided to M-1 series-coupled delay elements 312b through 312m, where M is the number of taps of the FIR filter. Each delay element provides one sample period of delay. The signal r(n) and the outputs of delay elements 312b through 312m are provided to multipliers 314a through 314m, respectively. Each multiplier 314 also receives a respective filter coefficient $h_i(n)$ from coefficient calculation unit 320, multiplies its received samples with its filter coefficient $h_i(n)$, and provides output samples to a summer 316. For each sample period n, summer 316 sums the output samples from multipliers 314a through 314m and provides a filtered sample for that sample period. The filtered sample x(n) for sample period n may be computed as:

$$x(n) = \sum_{i=0}^{M-1} h_i^* \cdot r(n-i), \quad \text{Eq (1)}$$

where the symbol (*) denotes a complex conjugate. Summer 234 receives and subtracts the signal x(n) from the signal s(n) to provide the error signal e(n).

Coefficient calculation unit 320 provides the set of M coefficients for FIR filter 310, which is denoted as $H(n)=[h_0(n), h_1(n), \ldots h_{M-1}(n)]$. Unit 320 further updates these coefficients based on a particular adaptive algorithm, which may be the LMS, NLMS, recursive least square (RLS), direct matrix inversion (DMI), or some other algorithms. The NLMS and other algorithms are described by B. Widrow and S. D. Stems in a book entitled "Adaptive Signal Processing," Prentice-Hall Inc., Englewood Cliffs, N.J., 1986. The LMS, NLMS, RLS, DMI, and other adaptive algorithms are described by Simon Haykin in a book entitled "Adaptive Filter Theory", 3rd edition, Prentice Hall, 1996. The pertinent sections of these books are incorporated herein by reference.

Coefficient update unit 320 also receives the step size signal u(n) from adaptive step size control unit 238, which is used to control the manner in which the filter coefficients are updated. Unit 320 may also receive an update control signal (e.g., the double-talk control signal from double-talk detection unit 136 in FIG. 1) used to enable the updating of the coefficients. For example, the filter coefficients may be maintained (i.e., H(n+1)=H(n)) whenever double-talk is detected.

Figure 4:
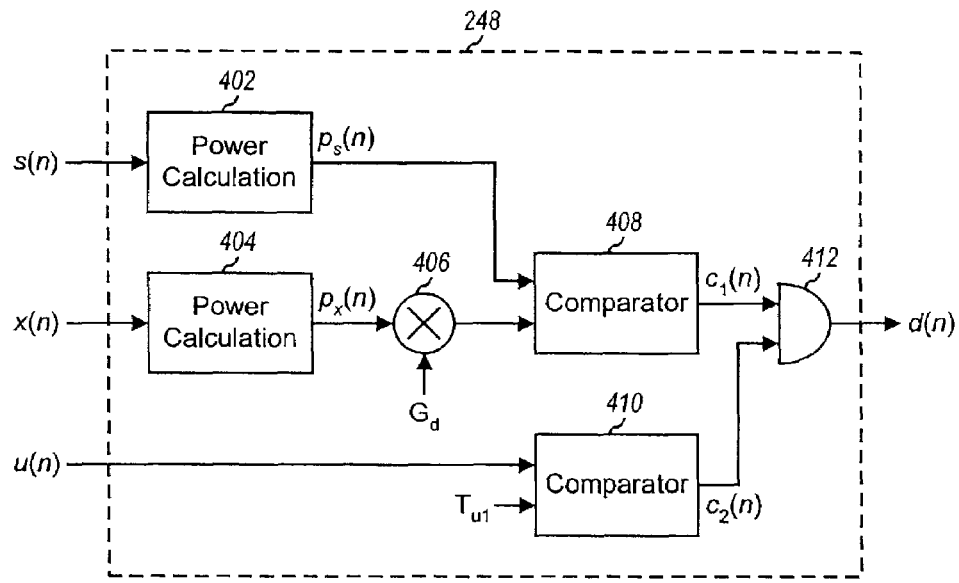
FIG. 4 shows a nonlinear echo detection unit.

FIG. 4 shows a block diagram of an embodiment of nonlinear echo detection unit 248. In this embodiment, within unit 248, a power calculation unit 402 receives the near-end signal s(n), computes the power of this signal, and provides the near-end signal power $p_s(n)$. Similarly, a power calculation unit 404 receives the echo estimate signal x(n), computes the power of this signal, and provides the estimated echo power $p_x(n)$. A multiplier 406 receives and multiplies the estimated echo power $p_x(n)$ with a gain $G_d$ to obtain a scaled echo power $G_d \cdot p_x(n)$.

A comparator 408 receives the near-end signal power $p_s(n)$ and the scaled echo power $G_d \cdot p_x(n)$, compares the two powers, and provides a comparison result $c_1(n)$, which is determined as follows:

$$c_1(n) = \begin{cases} 1 & \text{if } G_d \cdot p_x(n) > p_s(n) \\ 0 & \text{otherwise} \end{cases}. \quad \text{Eq (2)}$$

A comparator 410 receives the step size signal u(n), compares it against a threshold $T_{u1}$, and provides a comparison result $c_2(n)$, which is determined as follows:

$$c_2(n) = \begin{cases} 1 & \text{if } u(n) > T_{u1} \\ 0 & \text{otherwise} \end{cases}. \quad \text{Eq (3)}$$

An AND gate 412 receives the comparison results $c_1(n)$ and $c_2(n)$, performs a logical AND of the two results, and provides the detection signal d(n) that indicates whether or not large nonlinear echo is present in the near-end signal s(n). For the embodiment described above, the detection signal d(n) is set to true (i.e., d(n)=1) when both (1) the scaled echo power $G_d \cdot p_x(n)$ is larger than the near-end signal power $p_s(n)$ and (2) the step size signal u(n) is larger than the threshold $T_{u1}$. The detection signal d(n) is provided to and used by nonlinear echo suppression unit 250.

Figure 5:
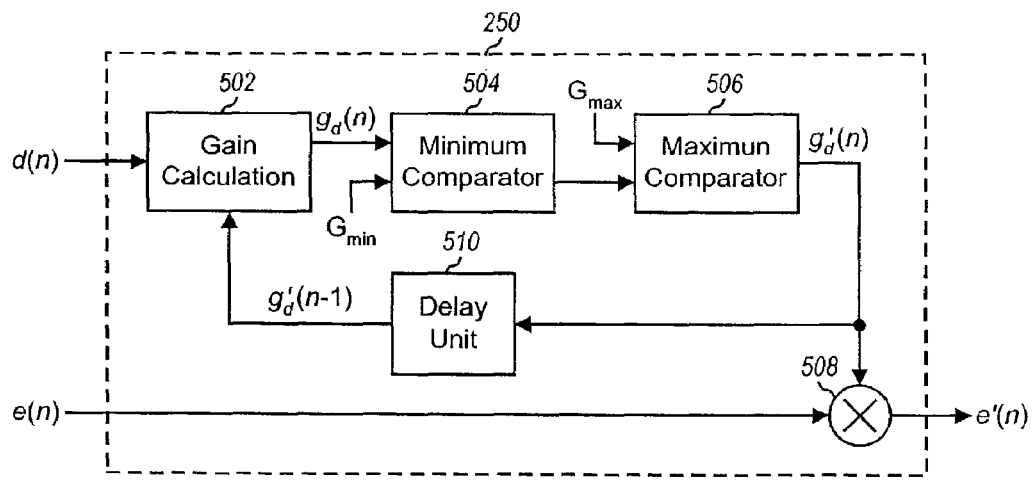
FIG. 5 shows a nonlinear echo suppression unit.

FIG. 5 shows a block diagram of an embodiment of nonlinear echo suppression unit 250. In this embodiment, within unit 250, a gain calculation unit 502 receives the detection signal d(n) from nonlinear echo detection unit 248 and a delayed gain $g_d'(n-1)$ computed for a prior sample period n-1. Gain calculation unit 502 then provides a variable gain $g_d(n)$ that decreases gradually whenever large nonlinear echo is detected (i.e., whenever d(n)=1) and increases gradually otherwise.

In one embodiment, the variable gain $g_d(n)$ is computed as:

$$g_d(n) = \begin{cases} g_d'(n-1) - \Delta g_{dn} & \text{if } d(n)=1 \\ g_d'(n-1) + \Delta g_{up} & \text{if } d(n)=0 \end{cases}, \quad \text{Eq (4)}$$

where $\Delta g_{dn}$ and $\Delta g_{up}$ are positive values that determine how much the variable gain $g_d(n)$ is decreased or increased for a given sample period. The constants $\Delta g_{dn}$ and $\Delta g_{up}$ determine the rate at which large nonlinear echo can be suppressed and may be selected to provide the proper echo suppression performance.

In another embodiment, the variable gain $g_d(n)$ is computed as:

$$g_d(n) = \begin{cases} g_d'(n-1) \cdot G_{dn} & \text{if } d(n)=1 \\ g_d'(n-1) \cdot G_{up} & \text{if } d(n)=0 \end{cases}, \quad \text{Eq (5)}$$

where $G_{dn}$ is a positive value less than 1.0 (i.e., $G_{dn}$<1.0) and $G_{up}$ is a positive value greater than one (i.e., $G_{up}$>1.0) that determine how much the variable gain $g_d(n)$ is decreased or increased for a given sample period.

A minimum comparator 504 then compares the gain $g_d(n)$ against a lower-limit gain value $G_{min}$ and provides the larger value of $g_d(n)$ and $G_{min}$. A maximum comparator 506 next compares the output of minimum comparator 504 against an upper-limit gain value $G_{max}$ and provides the gain $g_d'(n)$. The comparison operations to obtain the gain $g_d'(n)$ may be expressed as:

$$g_d'(n) = \begin{cases} G_{max} & \text{if} \quad g_d(n) > G_{max}, \\ g_d(n) & \text{if} \quad G_{max} \geq g_d(n) \geq G_{min}, \text{ and} \\ G_{min} & \text{if} \quad G_{min} > g_d(n). \end{cases} \quad \text{Eq (6)}$$

A delay unit 510 delays the gain $g_d'(n)$ by one sample period so that the delayed gain may be used by gain calculation unit 502 in the next sample period.

A multiplier 508 receives the error signal e(n) from adaptive filter 230 and multiplies it with the gain $g_d'(n)$ to provide the error signal e'(n). The error signal e'(n) is dependent on the error signal e(n) and the variable gain $g_d(n)$, and may be expressed as:

$$e'(n) = e(n) \cdot g_d'(n). \quad \text{Eq (7)}$$

FIGS. 4 and 5 show the suppression of large nonlinear echo using a single variable gain $g_d'(n)$ that is adjusted higher or lower depending on whether or not large nonlinear echo was detected. Other designs may also be implemented for nonlinear echo suppression unit 250, and this is within the scope of the invention. For example, a set of variable gains may be derived based on the detection signal d(n) and used to filter and/or scale the error signal e(n) to obtain the error signal e'(n) having at least some of the large nonlinear echo suppressed.

Figure 6A:
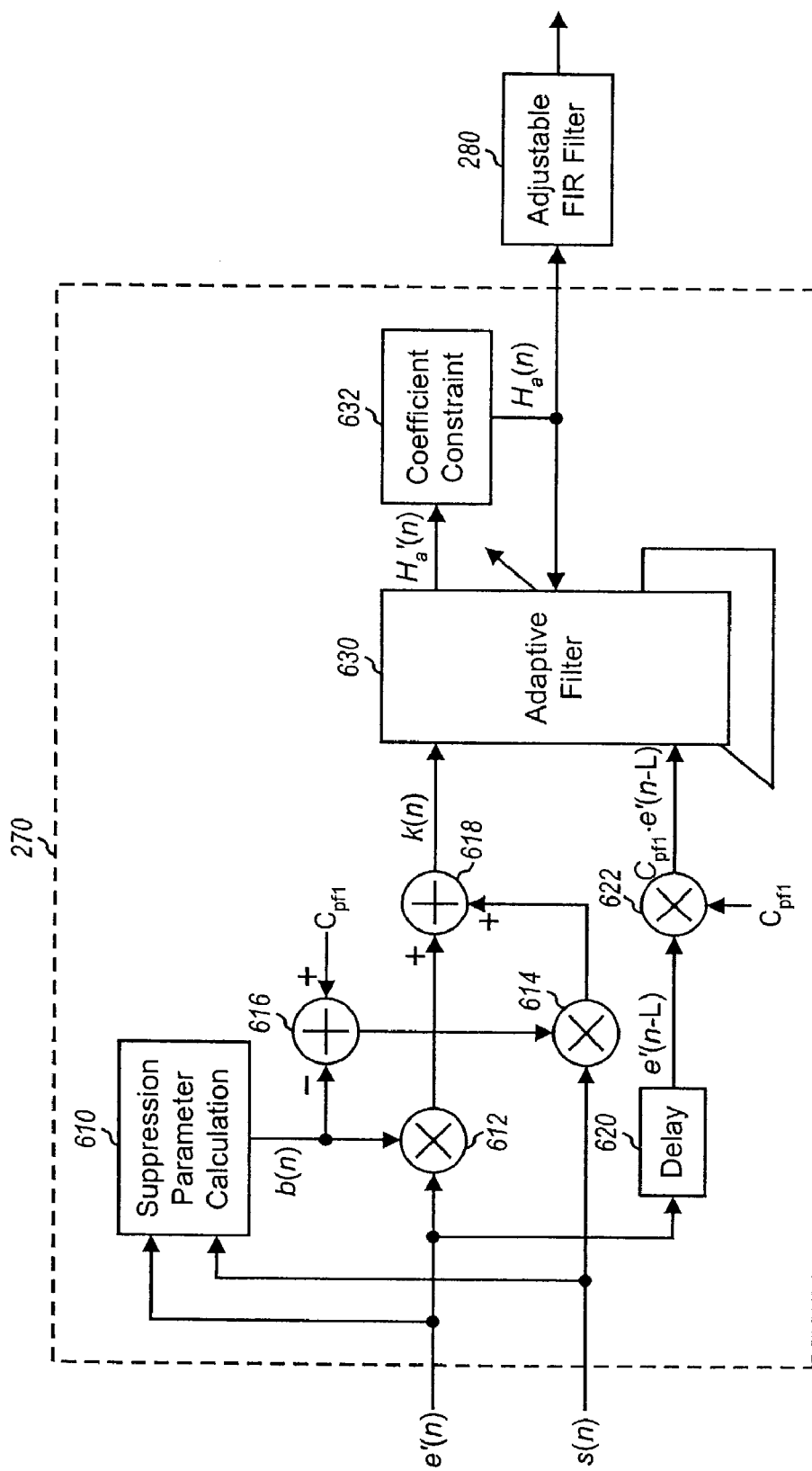
FIGS. 6A through 6C show a post filter.

FIG. 6A shows a block diagram of an embodiment of post filter 270. In this embodiment, within unit 270, a suppression parameter calculation unit 610 receives and processes the error signal e'(n) and the near-end signal s(n) to provide a suppression parameter b(n) that indicates the amount of cross-correlation between the signals e'(n) and s(n). The suppression parameter b(n) is multiplied with the error signal e'(n) by a multiplier 612 to provide the scaled error signal, b(n)·e'(n).

The suppression parameter b(n) is also subtracted from a constant $C_{pf1}$ (e.g., $C_{pf1}$=1) by a summer 616 to provide a second parameter, $C_{pf1}$−b(n), which is then multiplied with the near-end signal s(n) by a multiplier 614 to provide a scaled near-end signal $(C_{pf1}$−b(n))·s(n). The two scaled signals from multipliers 612 and 614 are then summed together by a summer 618 to provide a combined signal k(n). If $C_{pf1}$=1, then the combined signal k(n) may be expressed as:

$$k(n) = b(n) \cdot e'(n) + (1 - b(n)) \cdot s(n). \quad \text{Eq (8)}$$

The error signal e'(n) is also delayed by L samples by a delay element 620 to provide a delayed error signal e'(n−L). The signal e'(n−L) is then multiplied by the constant $C_{pf1}$ by a multiplier 622 to obtain a scaled signal, which is used as an input signal for an adaptive filter 630.

Adaptive filter 630 receives the combined signal k(n) and its input signal $C_{pf1}$·e'(n−L), processes these two signals, and provides a set of coefficients $H_a'(n)$. Adaptive filter 630 updates the coefficients $H_a'(n)$ in a manner to attempt to minimize the mean square error between the signal k(n) and the input signal $C_{pf1}$·e'(n−L). Adaptive filter 630 may be implemented using the same design as adaptive filter 230 in FIG. 3 and may implement the NLMS algorithm or some other adaptive algorithms.

The coefficients $H_a'(n)$ are provided to a coefficient constraint unit 632, which limits the magnitude of these coefficients to within a particular range of values to provide constrained coefficients $H_a(n)$. Coefficient constraint unit 632 may be used to ensure stability and prevent other deleterious effects.

The coefficients $H_a'(n)$ may be updated by adaptive filter 630 as follows:

$$H_a'(n) = H_a(n-1) + \Delta H_a(n), \quad \text{Eq (9)}$$

where $H_a(n-1)$ is the constrained coefficient vector provided by coefficient constraint unit 632 for the previous sample period, and $\Delta H_a(n)$ is the amount of adjustment for the constrained coefficients $H_a(n-1)$ to obtain the coefficients $H_a'(n)$ for the current sample period.

The adjustment $\Delta H_a(n)$ may be derived, for example, based on the NLMS algorithm. The constrained coefficients $H_a(n)$ are then derived by coefficient constraint unit 632 based on the coefficients $H_a'(n)$ and are provided as the output from post filter 270 to adjustable FIR filter 280.

Figure 6B:
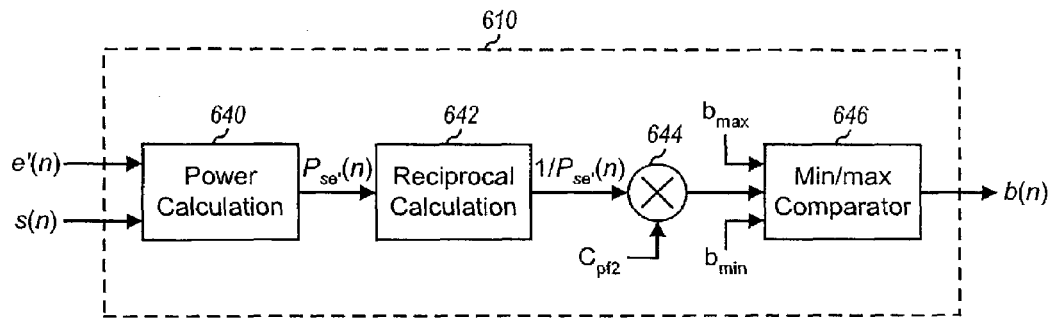

FIG. 6B shows a block diagram of an embodiment of suppression parameter calculation unit 610. In an embodiment, within unit 610, a power calculation unit 640 receives the error signal e'(n) and the near-end signal s(n) and calculates an average cross-correlated power $P_{se'}(n)$, which may be expressed as:

$$P_{se'}(n) = \alpha \cdot P_{se'}(n-1) + (1-\alpha) \cdot s(n) \cdot e'(n), \quad \text{Eq (10)}$$

where $\alpha$ is a "forgetting" factor for the power computation. As shown in equation (10), the cross-correlated power is first calculated as s(n)·e'(n) and then exponentially averaged. The factor $\alpha$ is a time constant for the exponential averaging, with a large value for $\alpha$ corresponding to a longer time constant.

The cross-correlated power $P_{se'}(n)$ is then reciprocated by a reciprocal calculation unit 642 and further multiplied by a multiplier 644 with a positive constant $C_{pf2}$. A comparator 646 then compares the output $C_{pf2}/P_{se'}(n)$ from multiplier 644 against an upper threshold $b_{max}$ and a lower threshold $b_{min}$ and provides the suppression parameter b(n), which may be expressed as:

$$b(n) = \begin{cases} b_{max} & \text{if} \quad C_{pf2}/P_{se'}(n) > b_{max}, \\ C_{pf2}/P_{se'}(n) & \text{if} \quad b_{max} \geq C_{pf2}/P_{se'}(n) \geq b_{min}, \text{ and} \\ b_{min} & \text{if} \quad b_{min} > C_{pf2}/P_{se'}(n). \end{cases} \quad \text{Eq (11)}$$

By limiting the suppression parameter b(n) to within the range of values defined by $b_{max}$ and $b_{min}$, certain deleterious effects may be avoided.

Figure 6C:
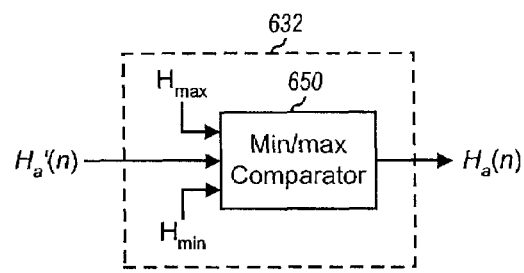

FIG. 6C shows a block diagram of an embodiment of coefficient constraint unit 632. Within unit 632, a comparator 650 receives the coefficients $H_a'(n)$ from adaptive filter 630, limits these coefficients to within a particular range of values defined by a maximum value $H_{max}$ and a minimum value $H_{min}$, and provides the constrained coefficients $H_a(n)$. In an embodiment, the comparison is individually performed for each coefficient, and a different set of maximum and minimum values, $H_{max}$ and $H_{min}$, may be used for each coefficient. The comparison of each coefficient $H_a'(n)$ may then be expressed as:

$$H_{a,i}(n) = \begin{cases} H_{max,i} & \text{if} \quad H'_{a,i}(n) > H_{max,i}, \\ H'_{a,i}(n) & \text{if} \quad H_{max,i} \geq H'_{a,i}(n) \geq H_{min,i}, \text{ and} \\ H_{min,i} & \text{if} \quad H_{min,i} > H'_{a,i}(n), \end{cases} \quad \text{Eq (12)}$$

where $H_{max,i}$ and $H_{min,i}$ are the maximum and minimum values, respectively, for the i-th coefficient of the vector $H_a'$, (n). In another embodiment, the same set of maximum and minimum values $H_{max}$ and $H_{min}$ may be used for all coefficients in the vector $H_a'(n)$. In yet another embodiment, a different set of maximum and minimum values $H_{max}$ and $H_{min}$ may be used for each group of indices.

The constrained coefficients $H_a(n)$ are then used by adaptive filter 630 to update the coefficients $H_a'(n)$, as shown in equation (9), and are also provided to adjustable FIR filter 280.

Figure 7:
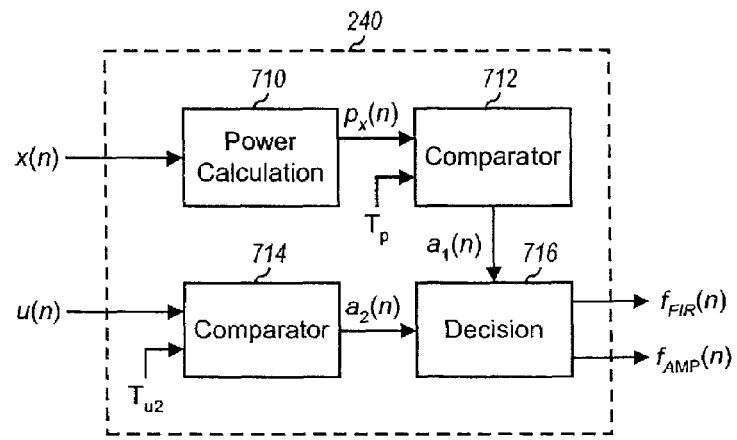
FIG. 7 shows a channel control unit.

FIG. 7 shows a block diagram of an embodiment of channel control unit 240, which provides the control signals used to dynamically adjust the echo cancellation such that improved performance may be achieved by echo cancellation system 200. In an embodiment, if the far-end signal is detected, then the gain g(n) of amplifier 224 may be reduced, adjustable FIR filter 280 may be enabled, and so on. Conversely, if only the near-end signal is present, then the gain g(n) of amplifier 224 may be increased, adjustable FIR filter 280 may be disabled, and so on.

Within unit 240, a power calculation unit 710 computes the power $p_x(n)$ of the echo estimate signal x(n), and may further average the echo power $p_x(n)$. A comparator 712 then compares the averaged or unaveraged echo power $p_x(n)$ against an echo power threshold $T_p$ to obtain a first indicator signal $a_1(n)$, which may be expressed as:

$$a_1(n) = \begin{cases} 1, & \text{if} \quad p_x(n) < T_p, \text{ and} \\ 0, & \text{if} \quad p_x(n) \geq T_p. \end{cases} \quad \text{Eq (13)}$$

A comparator 714 receives the step size signal u(n) and compares this signal against a step size threshold $T_{u2}$ to obtain a second indicator signal $a_2$ (n), which may be expressed as:

$$a_2(n) = \begin{cases} 1, & \text{if} \quad u(n) < T_{u2}, \text{ and} \\ 0, & \text{if} \quad u(n) \geq T_{u2}. \end{cases} \quad \text{Eq (14)}$$

The indicator signals $a_1(n)$ and $a_2(n)$ are provided to a decision unit 716 and evaluated to derive the control signals $f_{FIR}(n)$ and $f_{AMP}(n)$ for adjustable FIR filter 280 and adjustable amplifier 224, respectively. In an embodiment, these control signals may be derived as follows:

$$f_{FIR}(n) = \begin{cases} 1, & \text{if} \quad a_1(n) = 1 \text{ and } a_2(n) = 1, \text{ and} \\ 0, & \text{otherwise,} \end{cases} \quad \text{Eq (15)}$$

and $$f_{AMP}(n) = \begin{cases} 1, & \text{if} \quad a_1(n) = 0 \text{ and } a_2(n) = 0, \text{ and} \\ 0, & \text{otherwise.} \end{cases} \quad \text{Eq (16)}$$

As shown in equations (15) and (16), if the echo power $p_x(n)$ is small ($p_x(n) < T_p$) and the step size signal is also small ($u(n) < T_{u2}$), indicating that only the near-end signal is present, then the control signal $f_{FIR}(n)$ is set to logic high. Otherwise, the control signal $f_{FIR}(n)$ is set to logic low. If the echo power $p_x(n)$ is large ($p_x(n) \geq T_p$) and the step size signal is also large ($u(n) \geq T_{u2}$), indicating that the far-end signal exists, then the control signal $f_{AMP}(n)$ is set to logic high. A smaller gain (g(n)=$g_1$) may then be used for adjustable amplifier 224. Otherwise, the control signal $f_{AMP}(n)$ is set to logic low, and a larger gain (g(n)=$g_2$, where $g_2 > g_1$) may be used for the adjustable amplifier.

In the above embodiment, the step size signal u(n) is used to derive the indicator signal $a_2(n)$, which is then used to derive the control signals $f_{FIR}(n)$ and $f_{AMP}(n)$, as shown in equations (15) and (16). If adaptive step size control unit 238 is not used to control the updating of adaptive filter 230, then the term $a_2(n)$ may be ignored in equations (15) and (16) and the control signals $f_{FIR}(n)$ and $f_{AMP}(n)$ may be derived based only on the indicator signal $a_1(n)$.

Figure 8:
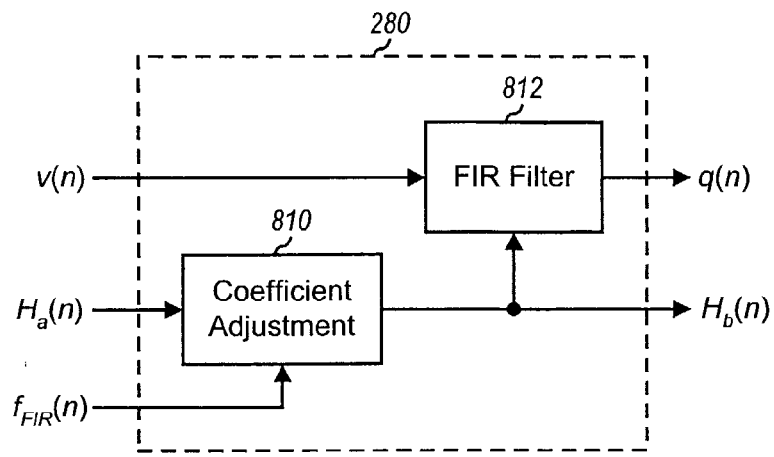
FIG. 8 shows an adjustable FIR filter.

FIG. 8 shows a block diagram of an embodiment of adjustable FIR filter 280. Within filter 280, a coefficient adjustment unit 810 receives and adjusts the vector of coefficients $H_a(n)$ from post filter 270 based on the control signal $f_{FIR}(n)$ received from channel control unit 240. In an embodiment, the adjusted coefficients $H_b(n)$ are derived as follows:

$$H_b(n) = \begin{cases} \delta(n), & \text{if} \quad f_{FIR}(n) = 1, \text{ and} \\ H_a(n), & \text{otherwise,} \end{cases} \quad \text{Eq (17)}$$

where $\delta(n)$ is an impulse vector having the same number of coefficients as the vector $H_a(n)$ and is defined as:

$$\delta(n) = \begin{cases} \delta_m(n) = 1, & \text{for } m = \text{index of the middle coefficient of } H_a(n) \\ \delta_i(n) = 0, & \text{for } i \neq m. \end{cases}$$

An FIR filter 812 receives and filters the signal v(n) from noise estimator 260 with the adjusted coefficients $H_b(n)$ to provide the signal q(n). If the control signal $f_{FIR}(n)$ is set to logic high, indicating that only the near-end signal is present, then the adjusted coefficients $H_b(n)$ are set to the impulse vector $\delta(n)$ and the FIR filtering is effectively bypassed (i.e., not performed). Otherwise, if the control signal $f_{FIR}(n)$ is set to logic low, indicating that a large amount of echo is detected, then the adjusted coefficients $H_b(n)$ are set to the coefficients $H_a(n)$ and the filtering is performed based on these coefficients to further suppress echo residue.

Figure 9:
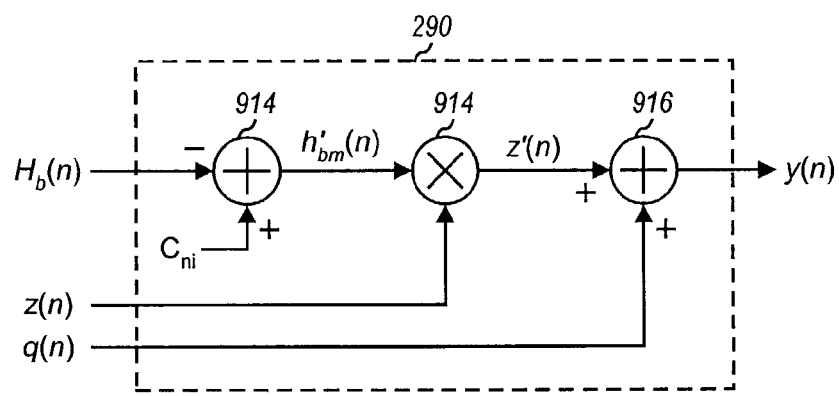
FIG. 9 shows a noise reinsertion unit.

FIG. 9 shows a block diagram of an embodiment of noise reinsertion unit 290. In this embodiment, the center coefficient $h_{bm}(n)$ in the set of coefficients $H_b(n)$ is provided to a summer 912 and subtracted from a value of $C_{ni}$ to obtain a scalar $h_{bm}'(n) = (C_{ni} - h_{bm}(n))$, where $C_{ni} = 1$ for an embodiment. The scalar $h_{bm}'(n)$ is indicative of the amount of noise to be reinserted back and are determined indirectly by channel control unit 240. A multiplier 914 receives and scales the noise estimate signal z(n) received from noise estimator 260 with the scalar $h_{bm}'(n)$ to provide the noise component z'(n) to be inserted back. The noise component z'(n) is then added back to the signal q(n) by a summer 916 to provide the noise-suppressed and echo-canceled output signal y(n). This entire process of noise reinsertion is also referred to as "noise paste". The signal y(n) has as much of the echo removed as possible and approximately constant amount of noise.

Figure 10:
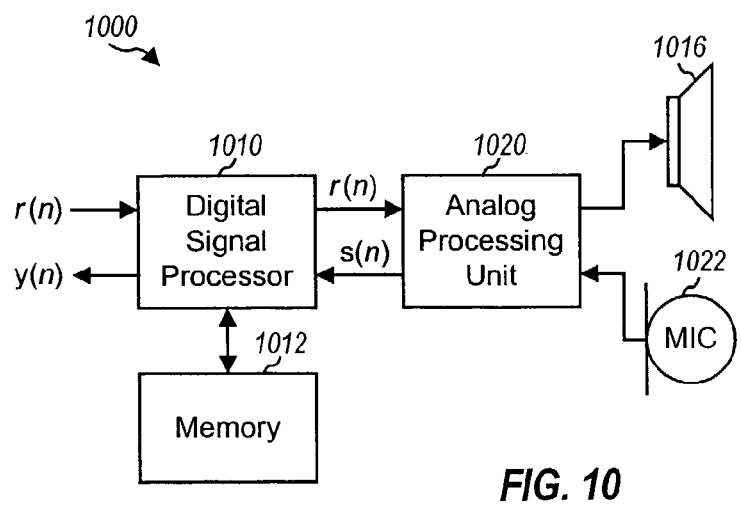
FIG. 10 shows an implementation of an echo cancellation system.

FIG. 10 shows a diagram of an implementation of an echo cancellation system 1000. In this implementation, system 1000 includes a digital signal processor (DSP) 1010, a memory 1012, an analog processing unit 1020, a speaker 1016, and a microphone 1022. Digital signal processor 1010 may be designed to implement various processing units for echo suppression, such as the processing units shown in FIG. 2. Memory 1012 provides storage for program codes and data used by signal processor 1010. Analog processing unit 1020 performs the analog processing and may include D/A converter 212 and power amplifier 214 in the output path and adjustable amplifier 224 and A/D converter 226 in the input path. Digital signal processor 1010 may then implement the remaining processing units of system 200.

For clarity, specific embodiments of various processing units for echo cancellation systems 100 and 200 have been described above. Various alternative designs may be used for these processing units, and this is within the scope of the invention. Moreover, certain processing units may be omitted and/or different processing units may be added.

The echo suppression techniques described herein may be implemented by various means. For example, these techniques may be implemented in hardware, software, or a combination thereof. For a hardware implementation, the processing units used to implement the echo suppression may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the echo suppression techniques may be implemented with modules (e.g., procedures, functions, and so on) that perform the functions described herein. The software codes may be stored in a memory unit (e.g., memory 1012 in FIG. 10) and executed by a processor (e.g., digital signal processor 1010).

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An echo cancellation system comprising:
   an echo canceller unit operative to receive a reference signal and a near-end signal, derive an echo estimate signal based on the reference and near-end signals, cancel a portion of echo in the near-end signal based on the echo estimate signal, and provide the echo estimate signal and a first intermediate signal having residual echo not canceled by the echo canceller unit;
   a detection unit operative to detect for large nonlinear echo based on the echo estimate signal and to provide a detection signal indicating whether large nonlinear echo is detected; and
   an echo suppression unit operative to suppress large nonlinear echo in the first intermediate signal in accordance with the detection signal and to provide a second intermediate signal containing at least a portion of the first intermediate signal and having at least a portion of the large nonlinear echo suppressed, wherein the echo suppression unit derives a variable gain based on the detection signal and suppresses the large nonlinear echo in the first intermediate signal based on the variable gain.

2. The echo cancellation system of claim 1, wherein the echo canceller unit is implemented with an adaptive filter.

3. The echo cancellation system of claim 1, wherein the detection unit is operative to derive the detection signal based on power of the near-end signal and power of the echo estimate signal.

4. The echo cancellation system of claim 3, wherein the detection signal indicates that large nonlinear echo is detected if the power of the echo estimate signal is greater than the power of the near-end signal by a particular percentage.

5. The echo cancellation system of claim 1, wherein the detection unit is operative to derive the detection signal further based on a step size signal used to update filter coefficients of the echo canceller unit.

6. The echo cancellation system of claim 1, wherein the echo suppression unit is operative to decrease the variable gain if the detection signal indicates that large nonlinear echo is detected.

7. The echo cancellation system of claim 1, wherein the echo suppression unit is operative to increase the variable gain if the detection signal indicates that large nonlinear echo is not detected.

8. The echo cancellation system of claim 1, wherein the echo suppression unit is operative to limit the variable gain to a particular range of values.

9. The echo cancellation system of claim 1, wherein the echo suppression unit is operative to derive the variable gain iteratively based on a delayed variable gain for a prior sample period and the detection signal.

10. The echo cancellation system of claim 1, wherein the echo suppression unit is operative to suppress large echo due to high nonlinearity in electro-acoustic components or instability of the echo canceller unit or both high nonlinearity and instability.

11. The echo cancellation system of claim 1, further comprising:
    a post filter operative to provide a set of coefficients based on the near-end signal and the second intermediate signal, wherein the set of coefficients is used to cancel remaining echo in the second intermediate signal.

12. The echo cancellation system of claim 11, wherein the post filter is operative to derive the set of coefficients to minimize error between the near-end signal and the second intermediate signal.

13. The echo cancellation system of claim 11, further comprising:
    an adjustable filter operative to filter the second intermediate signal with the set of coefficients and to provide an output signal having at least a portion of the remaining echo in the second intermediate signal removed.

14. A method of canceling echo, comprising:
    deriving an echo estimate signal based on a reference signal and a near-end signal;
    canceling a portion of echo in the near-end signal based on the echo estimate signal to provide a first intermediate signal having residual echo;
    detecting for large nonlinear echo based on the echo estimate signal to provide a detection signal indicating whether large nonlinear echo is detected, wherein the detection signal indicates that large nonlinear echo is detected if power of the echo estimate signal is greater than that of the near-end signal by a Particular Percentage;
    generating a variable gain based on the detection signal; and
    suppressing large nonlinear echo in the first intermediate signal based on the variable gain to provide a second intermediate signal containing at least a portion of the first intermediate signal and having at least a portion of the large nonlinear echo suppressed.

15. The method of claim 14, wherein the large nonlinear echo is detected based on power of the near-end signal and power of the echo estimate signal.

16. The method of claim 14, wherein the variable gain is decreased if large nonlinear echo is detected and increased otherwise.

17. The method of claim 16, wherein the variable gain is limited to a particular range of values.

18. The method of claim 14, further comprising:
deriving a set of coefficients based on the near-end signal and the second intermediate signal, wherein the set of coefficients is used to cancel remaining echo in the second intermediate signal.

19. The method of claim 18, further comprising:
filtering the second intermediate signal with the set of coefficients to provide an output signal having at least a portion of the remaining echo in the second intermediate signal canceled.

20. An apparatus suitable for canceling echo, comprising:
means for deriving an echo estimate signal based on a reference signal and a near-end signal;
means for canceling a portion of echo in the near-end signal based on the echo estimate signal to provide a first intermediate signal having residual echo;
means for detecting for large nonlinear echo based on the echo estimate signal to provide a detection signal indicating whether large nonlinear echo is detected, wherein the detection signal indicates that large nonlinear echo is detected if power of the echo estimate signal is greater than that of the near-end signal by a Particular Percentage;
means for generating a variable gain based on the detection signal; and
means for suppressing large nonlinear echo in the first intermediate signal based on the variable gain to provide a second intermediate signal containing at least a portion of the first intermediate signal and having at least a portion of the large nonlinear echo suppressed.

* * * * *